US007119817B1

(12) United States Patent
Kawakami

(10) Patent No.: US 7,119,817 B1
(45) Date of Patent: Oct. 10, 2006

(54) IMAGE GENERATING SYSTEM AND PROGRAM

(75) Inventor: Masahide Kawakami, Kawasaki (JP)

(73) Assignee: Namco Bandai Games Inc., Tokyo (JP)

( * ) Notice: Subject to any disclaimer, the term of this patent is extended or adjusted under 35 U.S.C. 154(b) by 0 days.

(21) Appl. No.: 09/787,402

(22) PCT Filed: Jul. 21, 2000

(86) PCT No.: PCT/JP00/04883

§ 371 (c)(1),
(2), (4) Date: Apr. 12, 2001

(30) Foreign Application Priority Data

Jul. 21, 1999 (JP) ................................. 11/206769

(51) Int. Cl.
*G09G 5/00* (2006.01)
(52) U.S. Cl. ...................... 345/646; 345/606; 345/619; 345/629; 345/642
(58) Field of Classification Search ................ 345/646, 345/606, 619, 629, 642
See application file for complete search history.

(56) References Cited

U.S. PATENT DOCUMENTS

| 5,900,860 | A | * | 5/1999 | Ueda | .......................... | 345/600 |
| 6,040,840 | A | | 3/2000 | Koshiba et al. | | |
| 6,069,634 | A | | 5/2000 | Gibson | | |
| 6,133,898 | A | * | 10/2000 | Ludolph et al. | ............ | 345/790 |
| 6,299,524 | B1 | * | 10/2001 | Janssen et al. | ............... | 452/198 |
| 6,348,923 | B1 | * | 2/2002 | Murata | ........................ | 345/629 |
| 6,374,272 | B1 | * | 4/2002 | Bates et al. | .................. | 715/513 |
| 6,570,569 | B1 | * | 5/2003 | Tsukamoto et al. | ......... | 345/473 |
| 6,643,385 | B1 | * | 11/2003 | Bravomalo | .................. | 382/100 |

FOREIGN PATENT DOCUMENTS

| JP | 5-101161 | 4/1993 |
| JP | 5-233780 | 9/1993 |
| JP | 7-254075 | 10/1995 |
| JP | 10-208078 | 8/1998 |
| JP | 10-334278 | 12/1998 |
| JP | 2000-113225 | 4/2000 |

OTHER PUBLICATIONS

Games Universe, 1996-2004, Ageta Inc., A1 Games, pp. 1-5.*

* cited by examiner

*Primary Examiner*—Kee M. Tung
*Assistant Examiner*—Mike Rahmjoo
(74) *Attorney, Agent, or Firm*—Oliff & Berridge, PLC

(57) ABSTRACT

There are provided an image generating system and program which can generate an image of an object variable in its state depending on an impacted position, in real-time with less amount of data and reduced load in computation. The image generating system generates an image of an aggregate object formed by a plurality of part objects. The image generating system comprises: an object determination section (120) which determines part objects within a predetermined area in the aggregate object as objects to be changed in display form when an impact is applied to the aggregate object and the impacted position is included within the predetermined area; and an image generation section (160) which changes at least one of shape, color, position, rotation angle, direction, moving direction and moving speed of the part objects determined as objects to be changed and generates an image. The aggregate object may be formed by assembling a plurality of part objects having different shapes without any gaps. The image of the aggregate object may be generated as an image of a single object before the impact is applied thereto and as an image of an aggregate object after the impact.

16 Claims, 15 Drawing Sheets

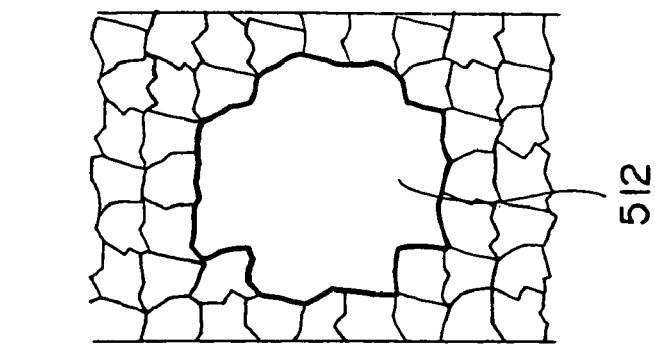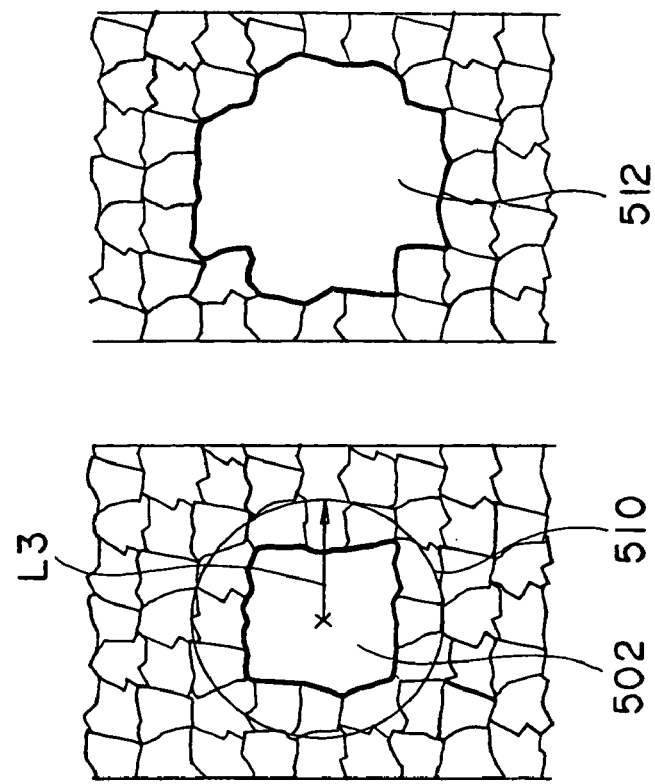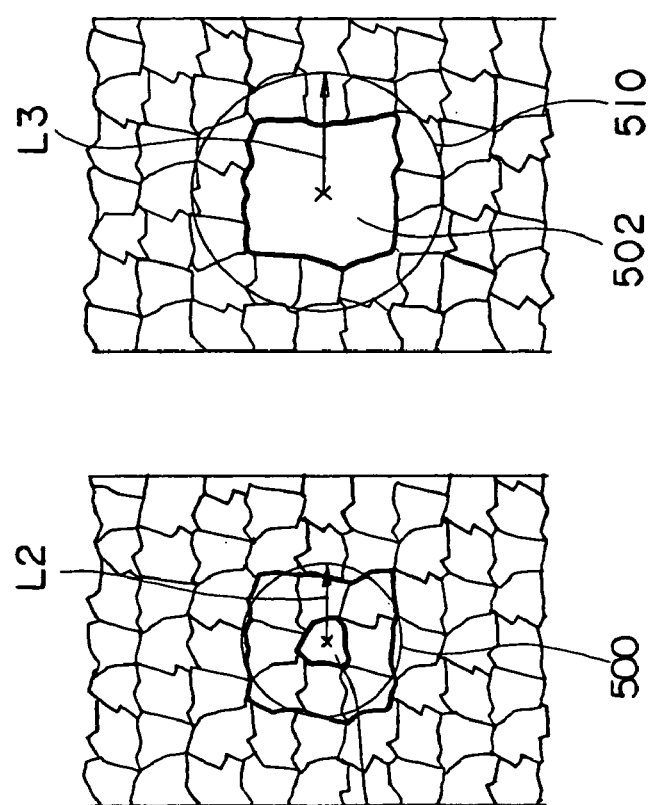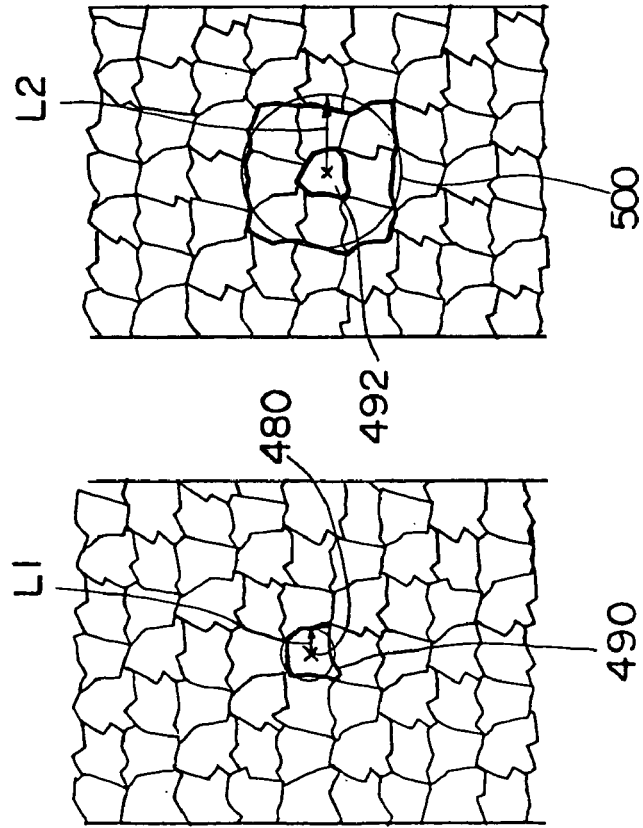

IMAGE GENERATING SYSTEM AND PROGRAM

TECHNICAL FIELD

The present invention relates to an image generating system and program.

BACKGROUND ART

There is known an image generating system which can generate an image as viewed within a virtual three-dimensional or object space from a given viewpoint. Such a system is very popular since one can experience a so-called virtual reality through it. Now considering a image generating system for playing a gun game, a player (or operator) can enjoy a three-dimensional shooting game by manipulating a gun-shaped controller (or shooting device) to shot targets such as enemy characters (or model objects) and the like which are displayed on a screen.

In order to improve the virtual reality for a player in such an image generating system, it was an important technical problem to produce more realistic images. It is thus desired that when, for example, a glass plate is broken by impact such as a bullet, the broken glass may more realistically be represented.

In the conventional image generating systems, however, when a bullet has hit a glass plate, the image is simply replaced by an image representing the broken glass plate which was previously provided. Independent of the hit position or the power of a bullet, the same image of a broken glass plate is shown. The representation is monotonic and lacks in reality.

According to such a technique, once a glass plate was broken by a first bullet, the image will not change even if the glass plate is hit by the succeeding bullets. Consequently, the representation was insufficient when it is possible that the glass plate is hit by many bullets in high-speed continuous shooting.

DISCLOSURE OF THE INVENTION

An object of the present invention is therefore to provide an image generating system and program which can generate an image of objects variable in their states depending on an impacted position, in real-time with less amount of data and reduced load in computation.

(1) The present invention provides an image generating system which generates an image of an aggregate object formed by a plurality of part objects, the system comprising: object determination means which determines part objects within a predetermined area in the aggregate object as objects to be changed in display form when an impact is applied to the aggregate object and the impacted position is included within the predetermined area; and image generation means which changes at least one of shape, color, position, rotation angle, direction, moving direction and moving speed of the part objects determined as objects to be changed and generates an image.

The present invention also provides a computer-readable program embodied on information storage medium or in a carrier wave, comprising information (or program) for implementing (or executing) the above-described means. The computer-readable program according to the present invention also comprises a processing routine for implementing (or executing) the means.

The predetermined area containing the impacted position may be an area spaced apart from the impacted position in all the directions by a constant distance, or an area containing the impacted position and spaced upward or downward from the impacted position. These areas may be determined depending on the type of the aggregate object to be represented, the breaking manner due to the impact and so on.

According to the present invention, at least one of shape, color, position, rotation angle, direction, moving direction and moving speed of the part objects within a given area containing the impacted position is changed to generate an image. Thus, an image of an object which changes according to the impacted position can more realistically be represented.

(2) In the image generating system or the program embodied on an information storage medium or in a carrier wave according to the present invention, an area in which the display form of the part objects is changed may be determined in accordance with at least one of the magnitude of the impact, the direction of the impact and the type of the aggregate object.

In such a manner, an image of an object which changes in accordance with the magnitude of the impact, the direction of the impact, the type of the aggregate object and so on can be represented. For example, a stronger impact may provide a larger area in which the display form of the part objects is changed.

(3) In the image generating system or the program embodied on an information storage medium or in a carrier wave according to the present invention, an area in which the display form is changed may be randomly determined.

In this case, the shape or dimensions of the area in which the display form is changed may be computed in real-time or the area may be selected from among a plurality of previously provided candidates. Thus, the change due to impact will not be monotonic.

(4) In the image generating system or the program embodied on an information storage medium or in a carrier wave according to the present invention, the display form of the part objects which are spaced more apart from the impacted position may be changed with more delay.

According to the present invention, an image can be generated in which the things surrounding the impacted position are changed in series.

(5) In the image generating system or the program embodied on an information storage medium or in a carrier wave according to the present invention, the part objects which have already been changed to a first display form may be changed into a second display form after a given time period has elapsed.

According to the present invention, an image which is necessarily changed after a predetermined time period can be generated.

For example, if a dish falls from a shelf and breaks on a floor due to an impact, time counted from the fall to the impact can be computed. In such a case, the image can be changed from the first state representing the falling dish into the second state representing the dish breaking on the floor due to the impact after a given time has elapsed from the first state.

(6) In the image generating system or the program embodied on an information storage medium or in a carrier wave according to the present invention, a plurality of image patterns used to generate images of the part objects after the change by the impact may be previously provided; and the images of the part objects after the change by the impact may be generated based on an image pattern selected from the plurality of image patterns.

Such a selection may be made at random or according to a predetermined condition.

If a plurality of image patterns are previously provided, more complicated change can be provided.

If an image pattern can be selected from among a plurality of image patterns representing various break states, the representation of the break can be made more realistically without monotony.

(7) In the image generating system or the program embodied on an information storage medium or in a carrier wave according to the present invention, the aggregate object may be formed by assembling the part objects having different shapes without any gaps.

For example, if a plurality of part objects having different shapes are assembled without any gaps to form a single flat surface, an aggregate object representing a glass plate, a wall or the like can be formed.

By assembling the plurality of part objects having different shapes, the breaking manner of an aggregate object due to an impact can be prevented from being monotonic.

If the outlines of the part objects are made irregular and complicated, jagged edges can be represented.

(8) In the image generating system or the program embodied on an information storage medium or in a carrier wave according to the present invention, an image of the aggregate object may be generated as an image of a single object before the impact is applied to the aggregate object, and the image may be generated as an image of the aggregate object formed by the plurality of part objects after the impact.

According to the present invention, the load on the image processing can be relieved since the image is generated as a single object prior to the application of the impact. Thus, the image can be generated more effectively by using the single and aggregate objects properly, if required.

BRIEF DESCRIPTION OF THE DRAWINGS

FIGS. 9A, 9B, 9C and 9D illustrate the embodiment in which the glass plate formed by the part objects spaced more apart from the impacted position is broken with more delay.

BEST MODES FOR CARRYING OUT THE INVENTION

One preferred embodiment of the present invention will now be described with reference to the drawings. Although the embodiment of the present invention will be described as to a gun game (or shooting game) using a gun-like controller, the present invention is not limited to such a form but may be applied to any of various other forms.

1. Layout

Figure 1:
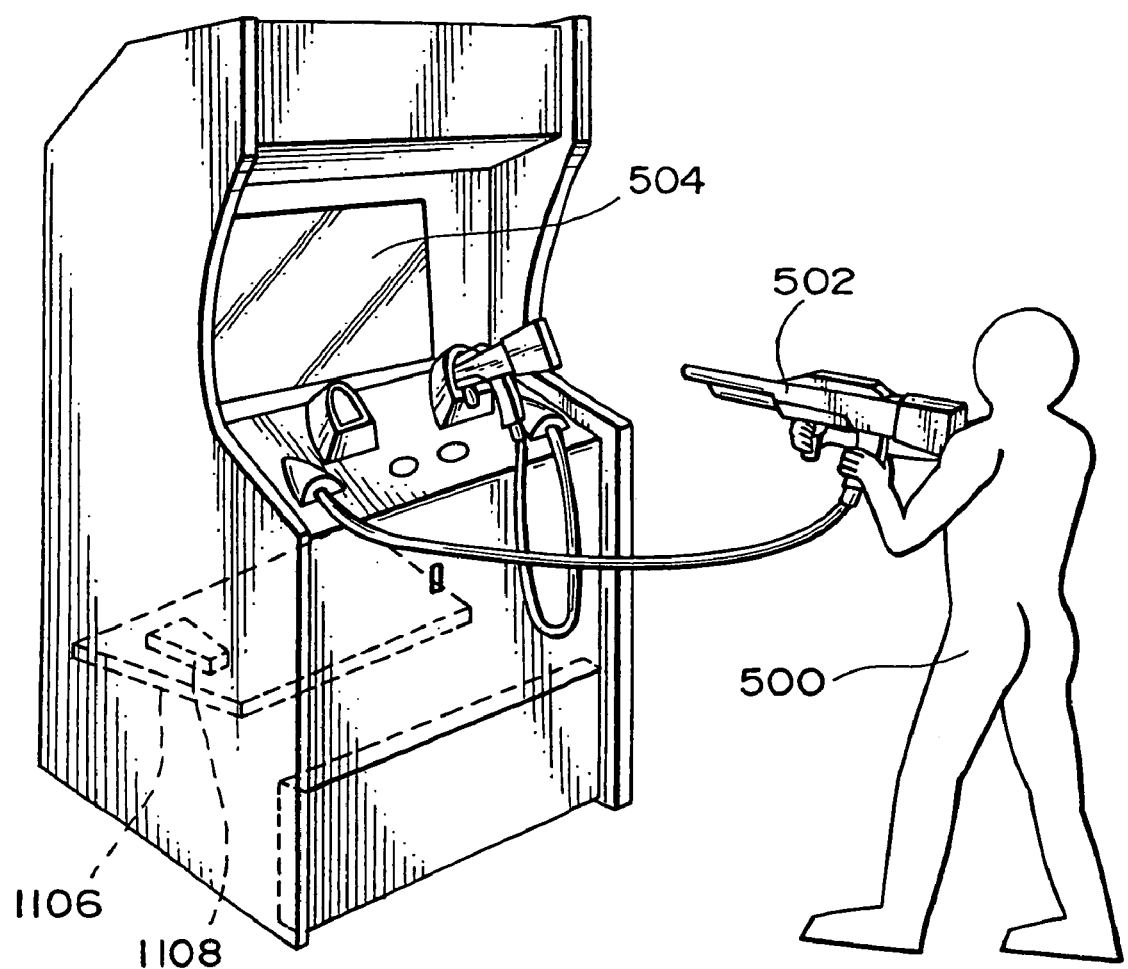
FIG. 1 is a view illustrating the appearance of an arcade game system according to the present invention.

FIG. 1 shows the layout of an arcade game system to which the present invention is applied.

A player 500 holds a gun-shaped controller (or a shooting device in a broad sense) 502 which is formed similar to a real machine gun. The player 500 can enjoy the gun game by using the gun-shaped controller 500 to shot targets such as enemy characters (or model objects in a broad sense) which are displayed on a screen 504.

When the gun-shaped controller 502 is triggered, virtual shots such as bullets or the like will be fanned at high speed. Thus, the player can feel the virtual reality as if he or she is shooting the real machine gun.

A hit position of a shot (or bullet) may be sensed by using a photo-sensor on the gun-shaped controller 502 to sense a scanning ray on the screen or by using a light (or laser) beam emitted from the gun-shaped controller 502 to impinge against a target position which is in turn sensed by any suitable means such as CCD camera.

Figure 2:
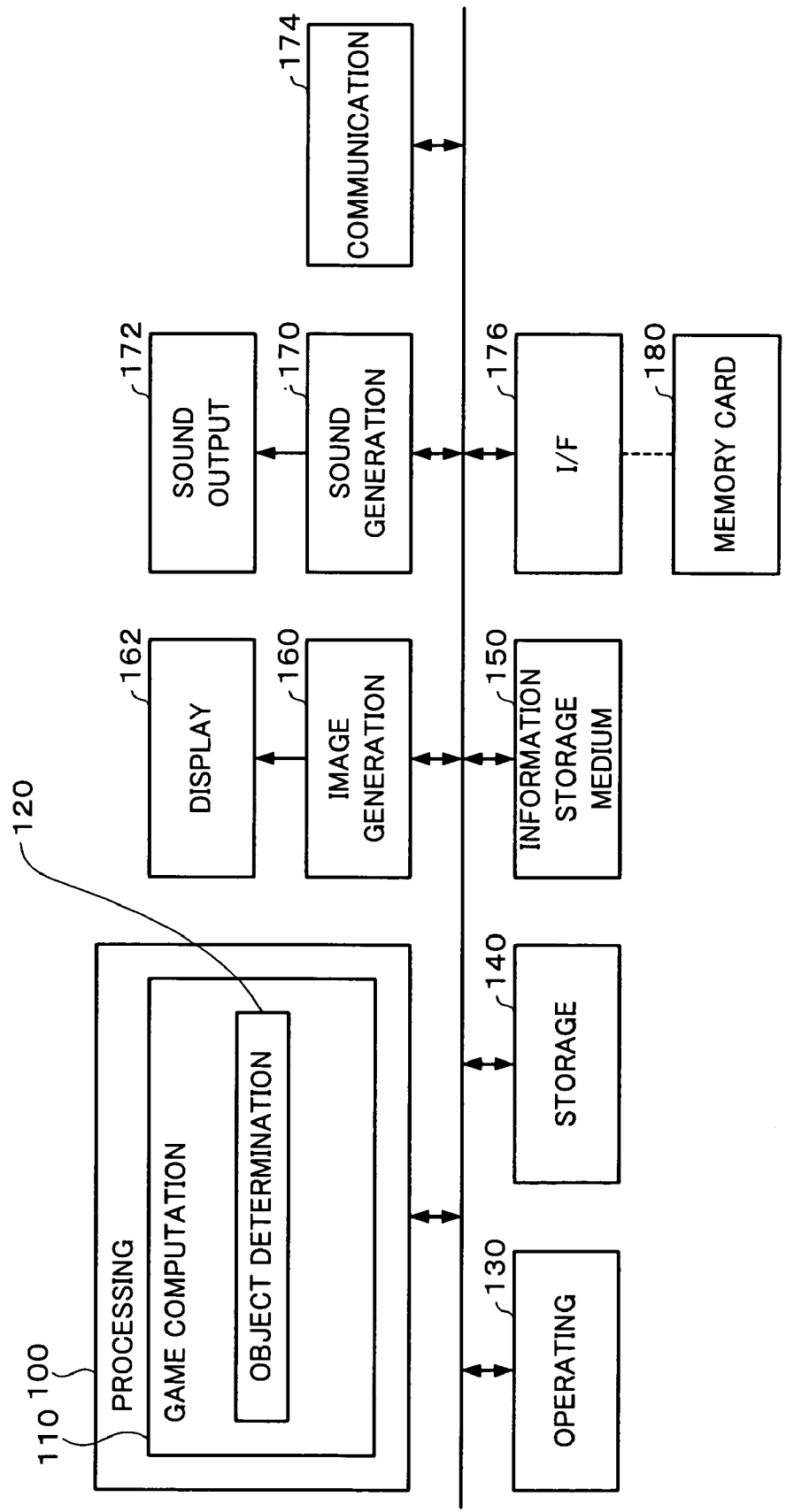
FIG. 2 is a block diagram of an image generating system according to one embodiment of the present invention.

FIG. 2 shows a block diagram of this embodiment. In this figure, this embodiment may comprise at least a processing section 100 or a processing section 100 with a storage section 140 or a processing section 100 with a storage section 140 and an information storage medium 150. Each of the other blocks (e.g., operating section 130, image generation section 160, display section 162, sound generation section 170, sound output section 172, communication section 174, I/F section 176, memory card 180 and so on) may take any suitable form.

The processing section 100 is designed to perform various processings for control of the entire system, commands to the respective blocks in the system, game computation and so on. The function thereof may be implemented through any suitable hardware means such as CPU (CISC type, RISC type), DSP or ASIC (or gate array or the like) or a given program (or game program).

The operating section 130 is used to input operational data from the player and the function thereof may be implemented through any suitable hardware means such as the gun-shaped controller 502 of FIG. 1, a lever, a button, a housing or the like.

The storage section 140 provides a working area for the processing section 100, image generation section 160, sound generation section 170, communication section 174, I/F section 176 and others. The function thereof may be implemented by any suitable hardware means such as RAM or the like.

The information storage medium (which may be a computer utilization storage medium) 150 is designed to store information including programs, data and others. The function thereof may be implemented through any suitable hardware means such as optical memory disk (CD or DVD), magneto-optical disk (MO), magnetic disk, hard disk, magnetic tape, semiconductor memory (ROM) or the like. The processing section 100 performs various processings in the present invention (or this embodiment) based on the information that has been stored in this information storage medium 150. In other words, the information storage medium 150 stores various pieces of information (or programs and data) for implementing (or executing) the means of the present invention (or this embodiment) which is particularly represented by the block included in the processing section 100.

Part or the whole of the information stored in the information storage medium 150 will be transferred to the storage section 140 when the system is initially powered on. The information stored in the information storage medium 150 may contain at least one of program code set for processing the present invention, image information, sound information, shape information of objects to be displayed, table data, list data, player information, command information for the processings in the present invention, information for performing the processings according to the commands and so on.

The image generation section 160 is designed to generate and output various images toward the display section 162 according to instructions from the processing section 100. The function thereof may be implemented through any suitable hardware means such as image generating ASIC, CPU or DSP or according to a given program (or image generating program) or based on image information.

The sound generation section 170 is designed to generate and output various sounds toward the sound output section 172 according to instructions from the processing section 100. The function thereof may be implemented through any suitable hardware means such as sound generating ASIC, CPU or DSP or according to a given program (or sound generating program) or based on sound information (waveform data and the like).

The communication section 174 is designed to perform various controls for communication between the game system and any external device (e.g., host machine or other image generating system). The function thereof may be implemented through any suitable hardware means such as communication ASIS or CPU or according to a given program (or communication program).

Information for implementing the processings in the present invention (or this embodiment) may be delivered from an information storage medium included in a host machine (or server) to the information storage medium 150 through a network and the communication section 174. The use of such an information storage medium in the hose device (or server) falls within the scope of the invention.

Part or the whole of the function in the processing section 100 may be implemented through the function of the image generation section 160, sound generation section 170 or communication section 174. Alternatively, part or the whole of the function in the image generation section 160, sound generation section 170 or communication section 174 may be implemented through the function of the processing section 100.

The I/F section 176 serves as an interface for information interchange between the game system and a memory card (or a portable information storage device including a portable game machine in a broad sense) 180 according to instructions from the processing section 100. The function thereof may be implemented through a slot into which the memory card is inserted, a data write/read controller IC or the like. If the information interchange between the game system and the memory card 180 is to be implemented in a wireless manner (e.g., through infra-red communication), the function of the I/F section 176 may be implemented through any suitable hardware means such as semiconductor laser, infra-red sensor or the like.

The processing section 100 further comprises a game computation section 110.

The game computation section 110 is designed to perform various processes such as coin (or charge) reception, setting of various modes, game proceeding, setting of image selection, determination of the position and rotation angle (about X-, Y- or Z-axis) of an object, determination of the view point and visual line (direction), regeneration (or generation) of the motion, arrangement of the object within the object space, hit checking, computation of the game results (or scores), processing for causing a plurality of players to play in a common game space, various game computations including game-over and other processes, based on operational data from the operating section 130 and according to the data and game program from the memory card 180.

The game computation section 110 includes an object determination section 120.

The object determination section 120 determines part objects within a given area containing the impacted position as objects to be changed in display form when an impact has been applied to an aggregate object.

The image generating section 160 performs the generation of image while varying at least one of the shape, color, position, rotation angle, direction, moving direction and moving speed of the part objects which have been determined to be objects to be changed.

The object determination section 120 may determine the area in which the display form of the part objects is changed, based on at least one of the magnitude of the impact, the direction of the impact and the type of aggregate object.

Furthermore, the object determination section 120 may determine the area in which the display form of the part objects is changed, under some predetermined conditions.

Moreover, the object determination section 120 may determine a part object spaced more apart from the impacted position as an object to be changed with more delay.

Still furthermore, the object determination section 120 may determine a part object already changed to the first display form as an object to be changed to the second display form after a given time period has elapsed.

The image generating section 160 may provide a plurality of image patterns used to generate the images of part objects changed due to impact and generate such images based on a given image pattern selected from the plurality of image patterns.

The image generating section 160 may form an aggregate object by assembling part objects having various different shapes without any clearance.

The image generating section 160 may perform the generation of image as a single object before an impact is applied to the aggregate object and as an aggregate object consisting of a plurality of part objects after the impact has been applied to the single object.

The image generating system of the present invention may be dedicated for a single-player mode in which only a single player can play the game or may have a multi-player mode in which a plurality of players can play the game.

If a plurality of players play the game, only a single terminal may be used to generate game images and sounds to be provided to all the players. Alternatively, a plurality of terminals interconnected through a network (transmission line or communication line) may be used in the present invention.

2. Features and Operations in the Present Invention

The features and operations of the present invention will be described with reference to when a glass plate is broken into pieces by a bullet.

Figure 3:
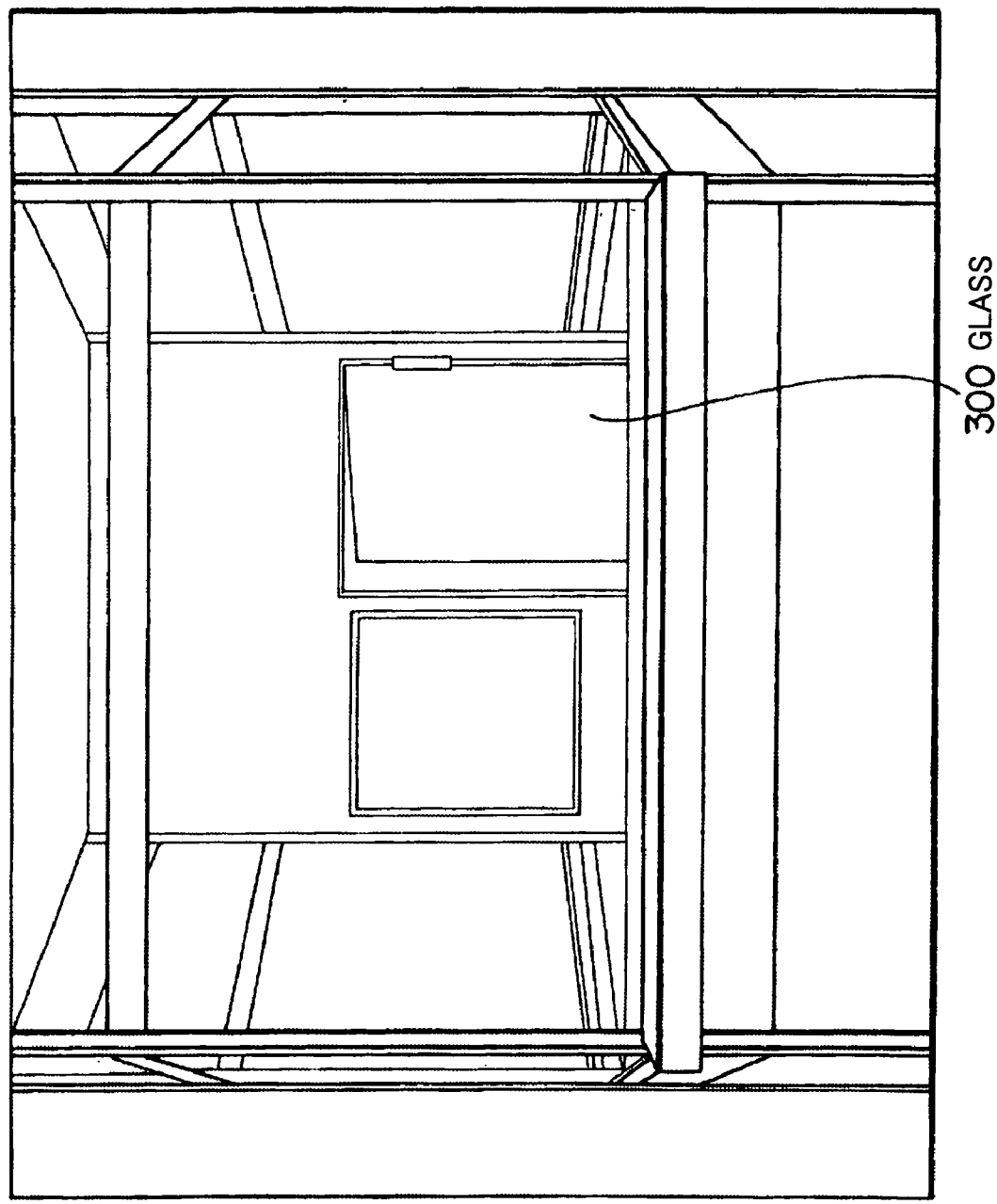
FIG. 3 illustrates a game image in one embodiment of the present invention.
Figure 4:
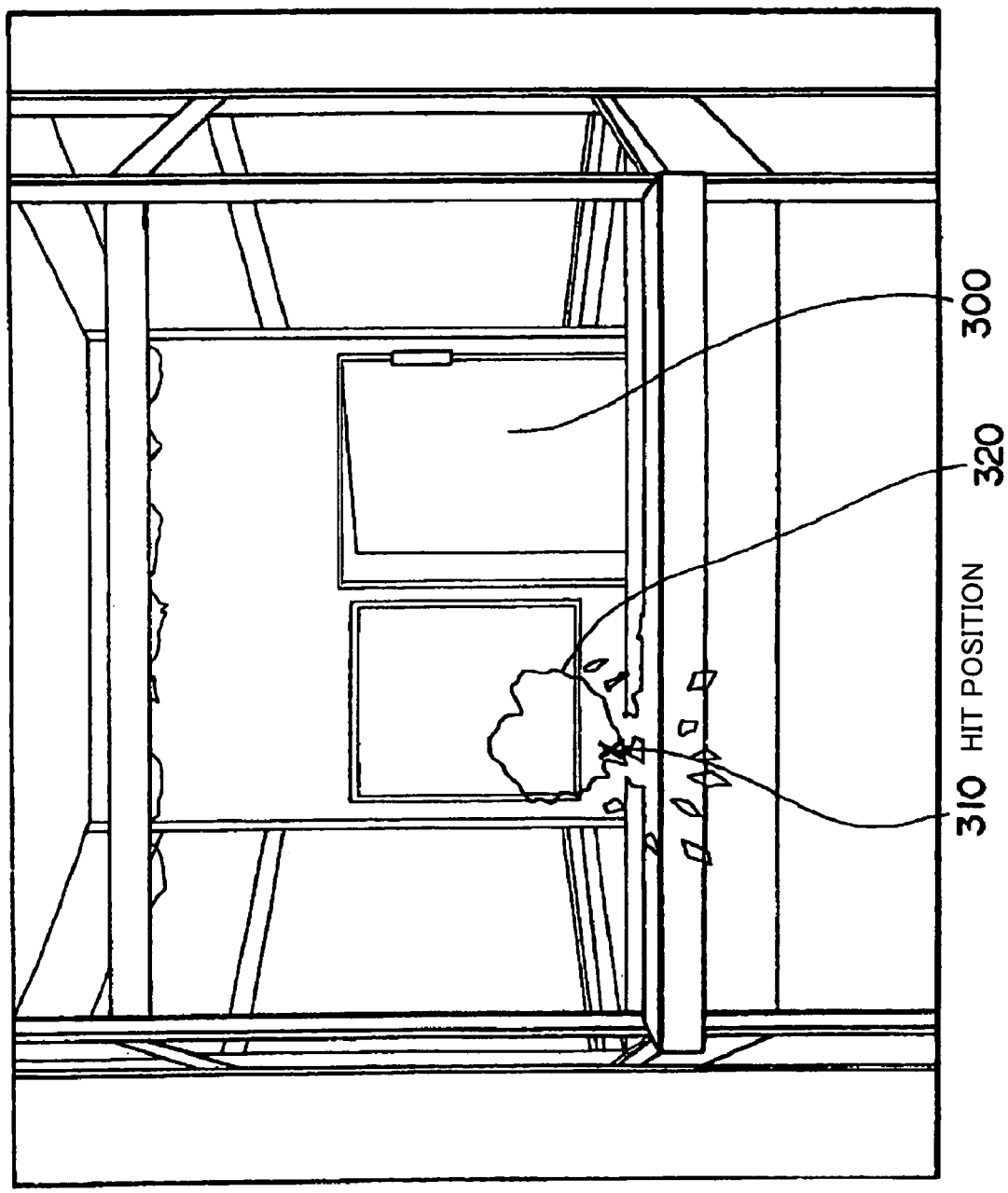
FIG. 4 illustrates another game image in one embodiment of the present invention.

FIGS. 3 and 4 show game images in this embodiment. The glass plate 300 of FIG. 3 is an object to be broken into pieces by a bullet in this embodiment. FIG. 4 shows the glass plate 300 including a hit position 310 and its surrounding part broken into pieces.

In such a manner, the glass plate will be broken into pieces within a predetermined area 320 containing the hit position 310. Unlike the conventional game image which had been broken into pieces in the same manner independent of the hit position, the present invention can generate a more realistic game image in which a glass plate is broken into pieces in accordance with the hit position.

An example of a process for generating such images as shown in FIGS. 3 and 4 according to the present invention will be described.

Figure 5A:
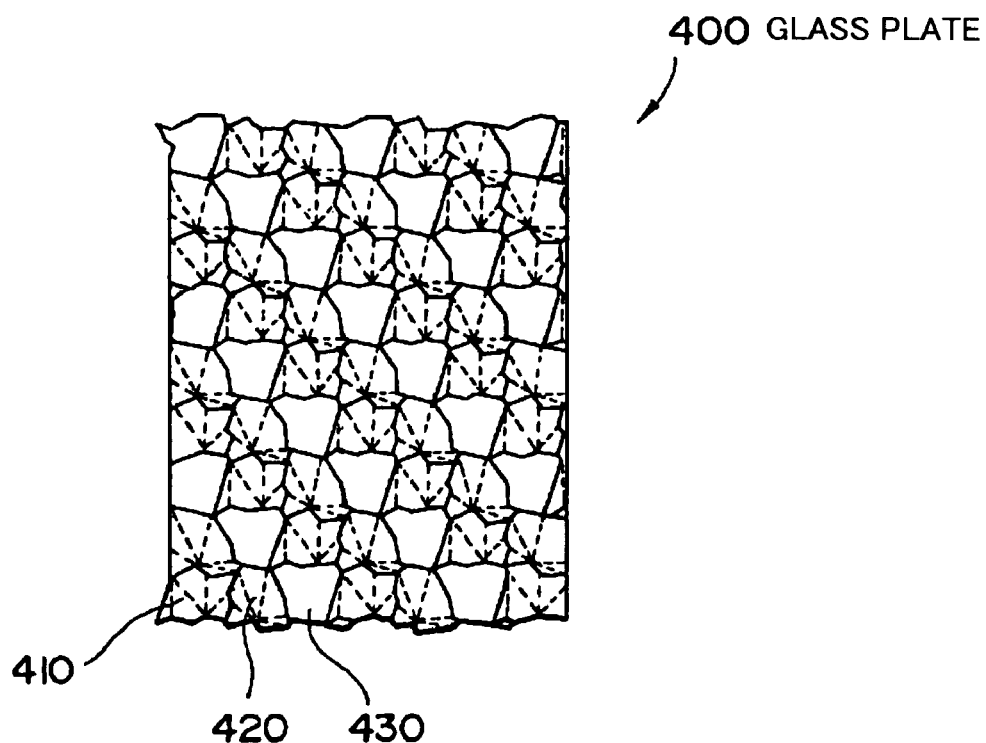
FIGS. 5A and 5B illustrate a glass plate object to be broken into pieces in one embodiment of the present invention.
Figure 5B:
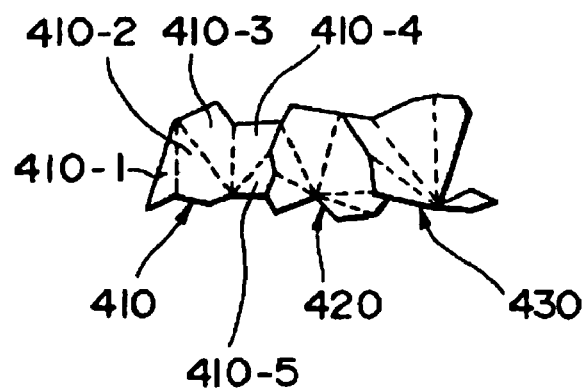

FIGS. 5A and 5B illustrate an object of glass plate which will be broken into pieces according to the present invention.

An object of glass plate 400 has previously been divided into part objects representing fine glass pieces as shown by 410, 420, 430 in FIG. 5A. These part objects are assembled without clearance to represent a single glass plate.

It is preferred that a single object of glass plate is formed prior to reception of impact while this object is divided into part objects after impact. Thus, the load in computation can be reduced by generating the image of a single object prior to impact, resulting in efficient generation of image.

FIG. 5B illustrates the types of the part objects of glass pieces. In this form, three types of different part objects representing glass pieces as shown by 410, 420, 430 may be used to form an aggregate object of glass plate 400. Each of the part objects representing the glass pieces 410, 420, 430 is formed by a plurality of polygon faces. For example, one of the part objects 410 may be formed by polygon faces 410-1, 410-2, 410-3, 410-4 and 410-5.

Such an assembly of different glass pieces can provide an image of breaking glass in more complicated manner.

Figure 6B:
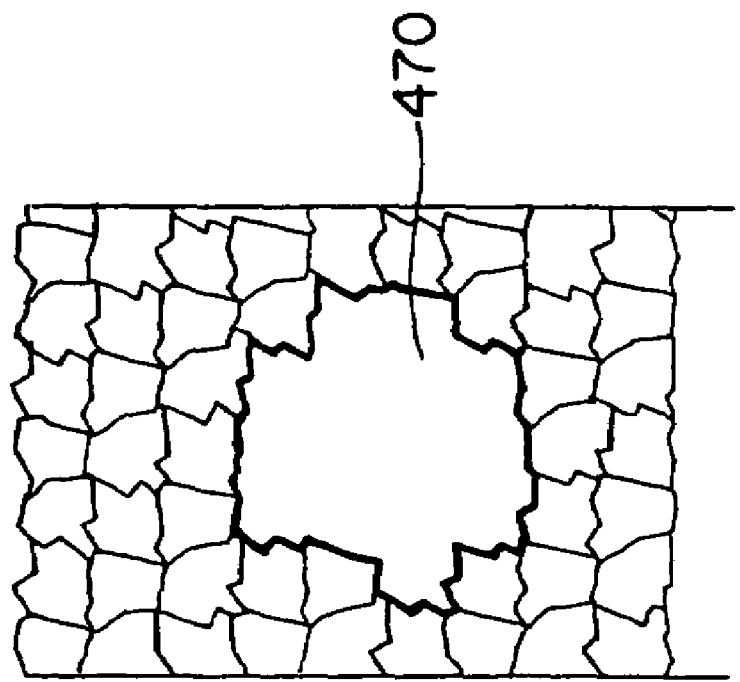
FIGS. 6A and 6B illustrate the impacted position and the break area.
Figure 6A:
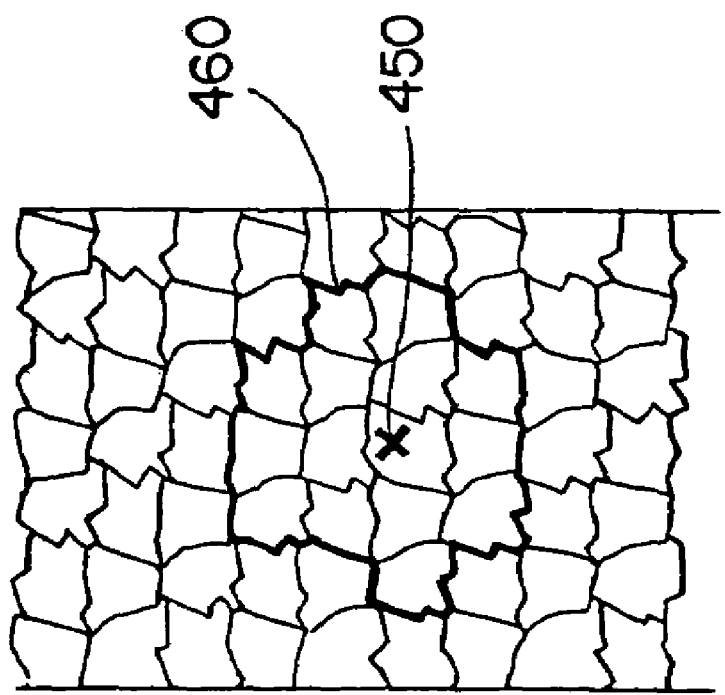

FIGS. 6A and 6B illustrate an impacted position and a break area.

If a bullet has hit the glass plate at 450 in FIG. 6A, all the glass pieces or part objects existing within a predetermined area 460 containing the hit position will be changed in the display form.

These glass pieces or part objects are changed into image patterns (which will be referred to "break patterns") representing the broken glass.

Figure 7:
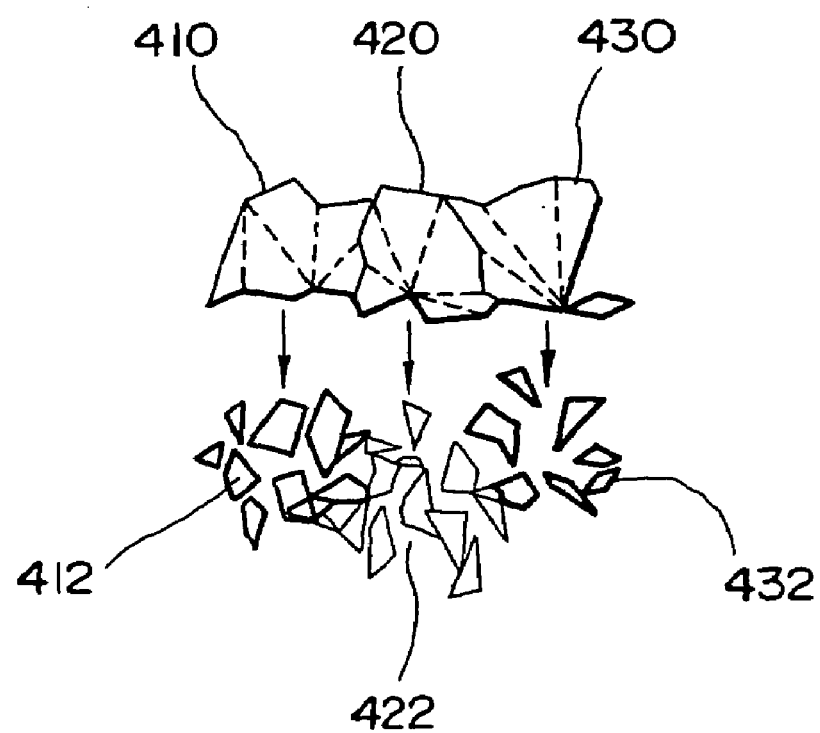
FIG. 7 illustrates break patterns of the part objects representing the glass pieces.

FIG. 7 illustrates break patterns of part objects for glass pieces. When a bullet hits the glass plate, the display forms for the glass pieces or part objects to be changed is shifted into break patterns. For example, a glass piece 410 may be changed to a break pattern 412; another glass piece 420 to another break pattern 422; and still another glass piece 430 to still another break pattern 432.

These break patterns will be moved downwardly as the frame progresses.

Figure 8:
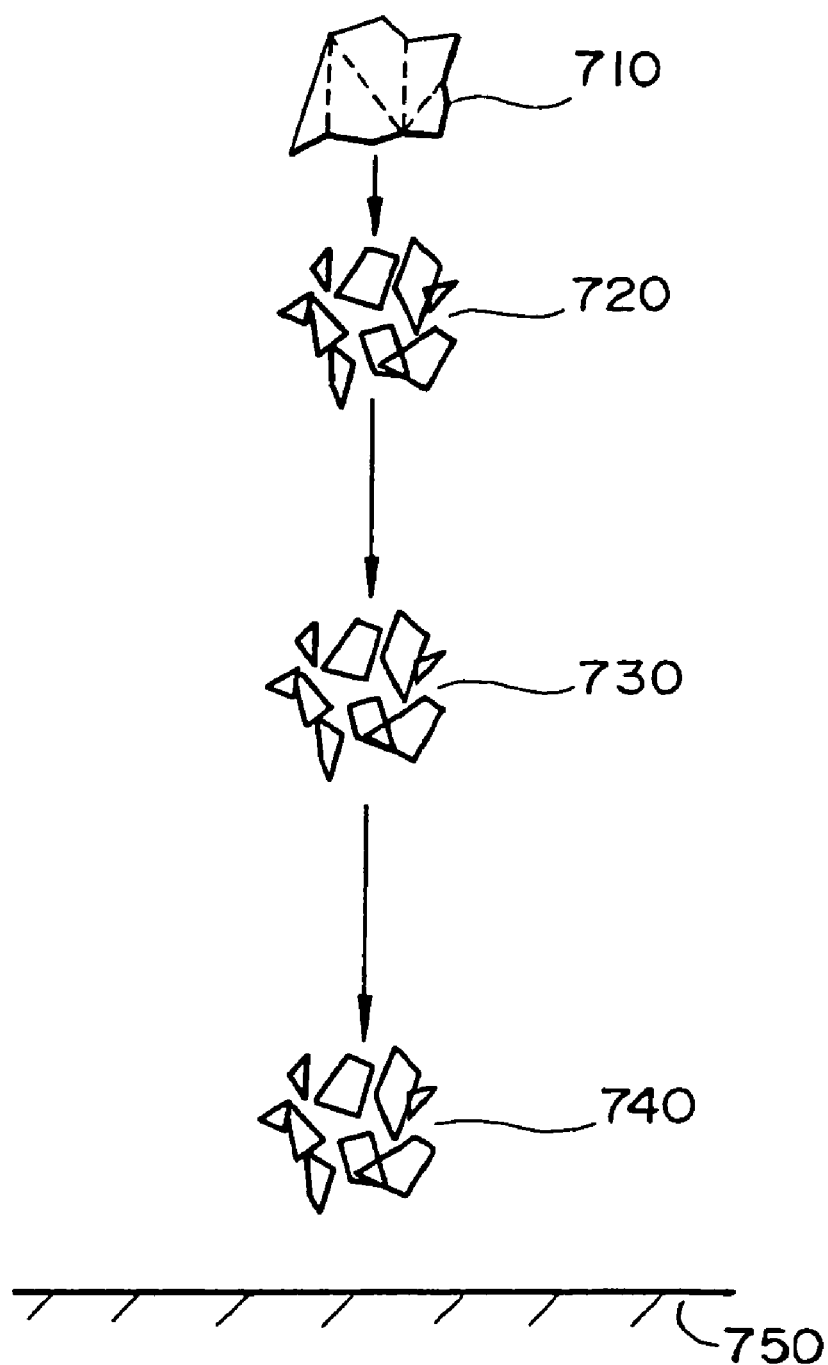
FIG. 8 illustrates the transit of the image showing a glass piece which is broken into smaller pieces

FIG. 8 shows the transit of the image showing a glass piece which is broken into smaller pieces.

Part objects of the glass piece before the break are as shown by an image 710. This is the glass piece in normal condition. This image corresponds to each glass piece shown in FIG. 5A which is placed at a predetermined normal position.

FIG. 8 shows break patterns 720–740 for glass pieces, in which the glass pieces move downwardly toward the ground 750 through passage of time as shown by 720, 730 and 740. In this case, the portion of the glass plate in which the glass pieces have been present is displayed such that they are removed from the glass plate, leaving a hole therein, as shown by 470 in FIG. 6B.

The glass pieces may be broken in series, rather than all the glass pieces are broken at a time, such that a glass piece more spaced apart from the impacted position will be broken with more delay.

FIGS. 9A, 9B, 9C and 9D illustrate the embodiment in which the glass piece formed by the part objects spaced more apart from the impacted position is broken with more delay.

If it is assumed that the impacted position is at 480 in FIG. 9A, the glass plate is broken into a glass piece or part object 490 which exists in a first change area (L1) nearest the impacted position 480 immediately after the impact has been applied to the glass plate. FIG. 9B shows a hole 492 formed in the glass plate by removing the glass piece 490 therefrom.

Next, the glass plate is broken, with a delay corresponding to a few frames, into glass pieces which exist in a second change area (L2) 500 secondly nearer the impacted position 480. FIG. 9C shows a hole 502 formed in the glass plate by removing these glass pieces therefrom.

Subsequently, the glass plate is broken, with a delay corresponding to a few frames, into glass pieces which exist in a third change area (L3) 510 thirdly nearer the impacted position 480. FIG. 9D shows a hole 512 formed in the glass plate by removing these glass pieces therefrom.

The part object belonging to each of the change areas may be determined depending on the distance from the impacted position. The distance from the impacted position to each of the glass pieces (GLn) is computed based on the coordinates of each corresponding part object. If GLn<L1, the glass plate will be broken into glass pieces at the first timing. If L1<GLn<L2, the glass plate will be broken into glass pieces at the second timing. If L2<GLn<L3, the glass plate will be broken into glass pieces at the next timing. In such a manner, the glass plate can be represented such that it begins to be broken from around the impacted position with the break propagating the surrounding glass pieces.

The magnitude, shape and the like within the break area may be determined in real-time depending on the magnitude of impact, the direction of impact, the type of aggregate object and so on. Whether the glass plate is broken at once or gradually may be determined according to the magnitude of impact, the direction of impact, the type of aggregate object and so on.

Figure 10C:
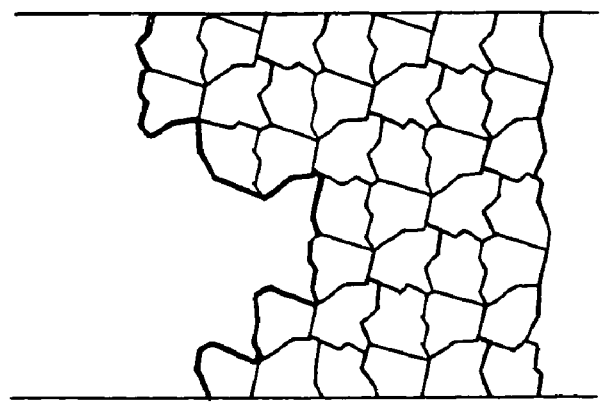
FIGS. 10A, 10B and 10C illustrate the progress of breaking of the glass plate.
Figure 10B:
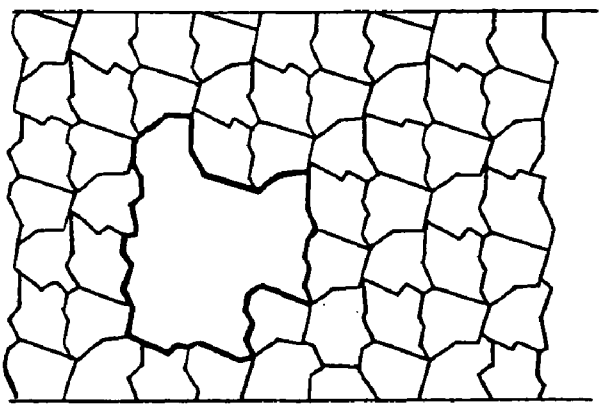
Figure 10A:
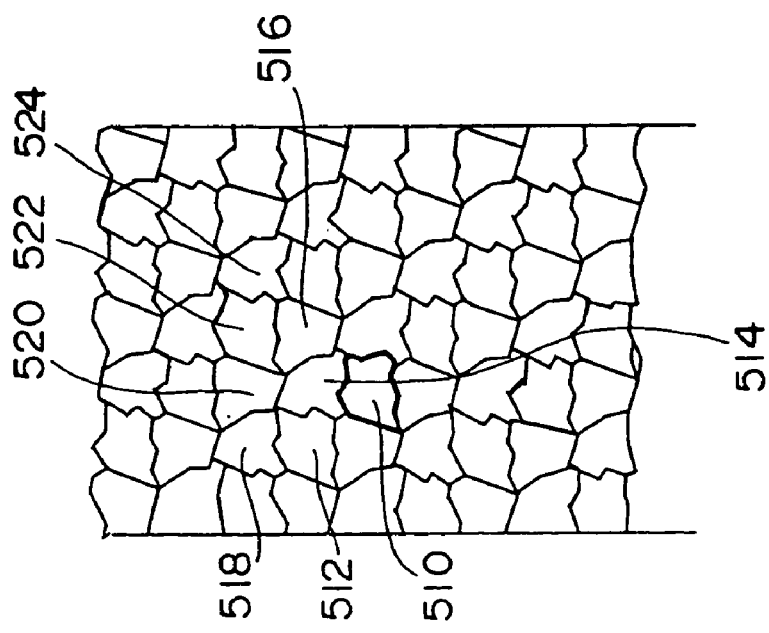

FIGS. 10A, 10B and 10C illustrate the other manner of break. For example, if a bullet hits the glass plate at a position near 510 in FIG. 10A, a glass piece or part object in the position 510 is first removed and the image of the corresponding break pattern is generated. With a delay corresponding to a few frames, glass pieces or part objects 512–524 located upward of the position 510 are then removed (see FIG. 10B) and the image of the corresponding break pattern is generated. With a further delay corresponding to a few frames, glass pieces or part objects located upward of the removed glass pieces or part objects are removed (see FIG. 10C) and the corresponding break pattern is generated.

In such a manner, the glass piece near the hit position will first be broken and the other glass pieces upward of the first broken glass piece will sequentially be broken with various delays each corresponding to the several frames.

Figure 11:
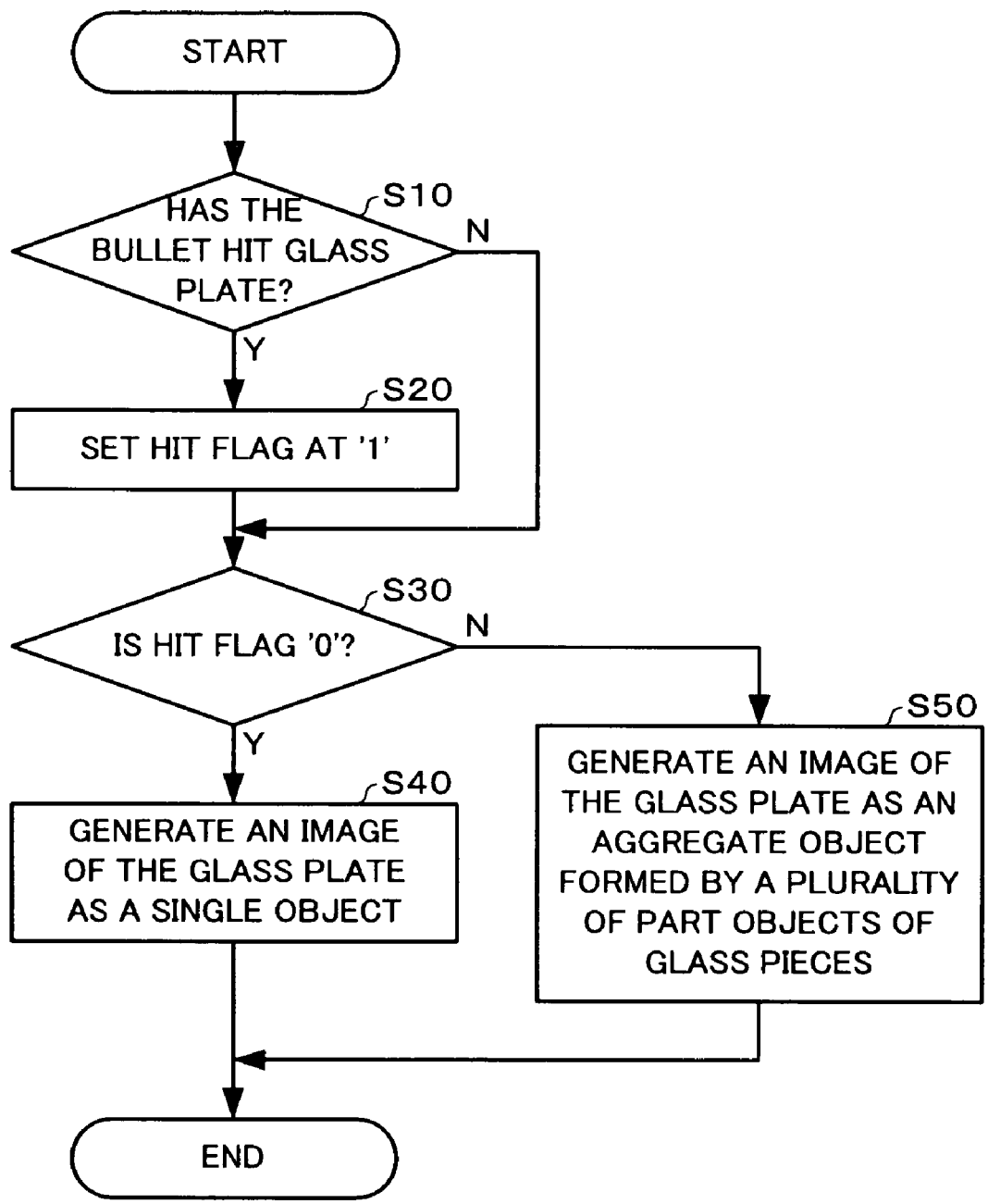
FIG. 11 is a flowchart illustrating an operation in the embodiment of the present invention.
Figure 12:
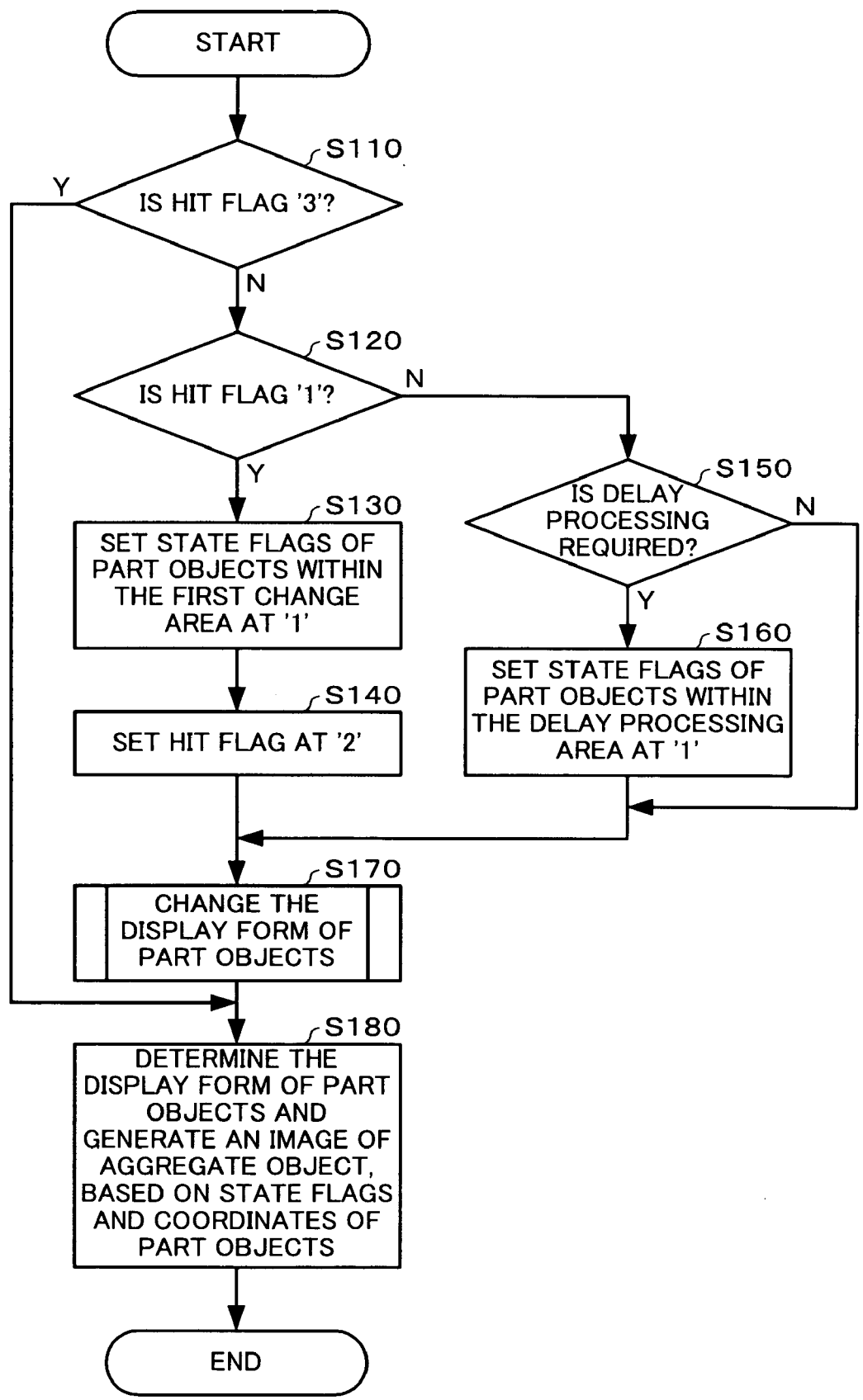
FIG. 12 is a flowchart illustrating another operation in the embodiment of the present invention.
Figure 13:
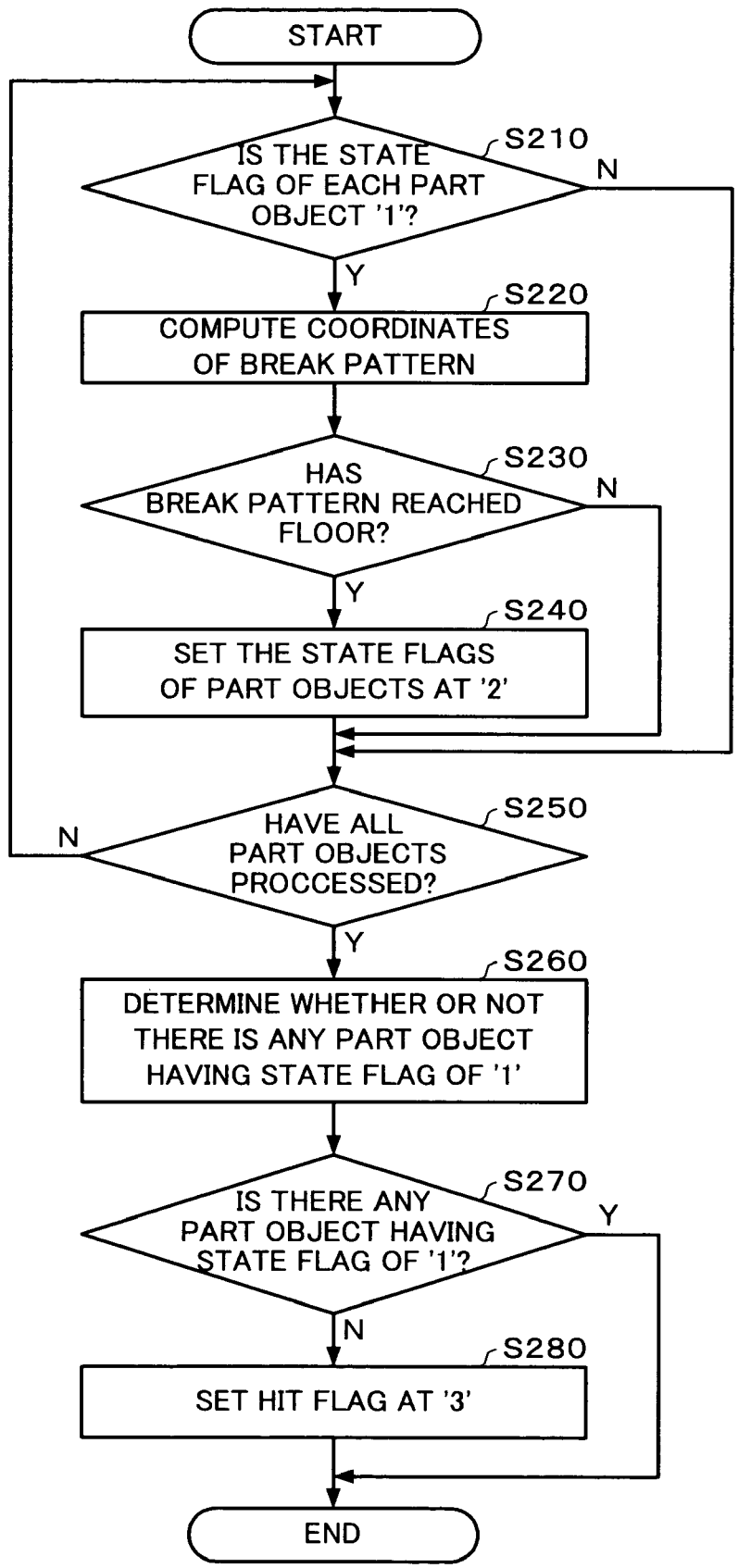
FIG. 13 is a flowchart illustrating still another operation in the embodiment of the present invention.
Figure 14:
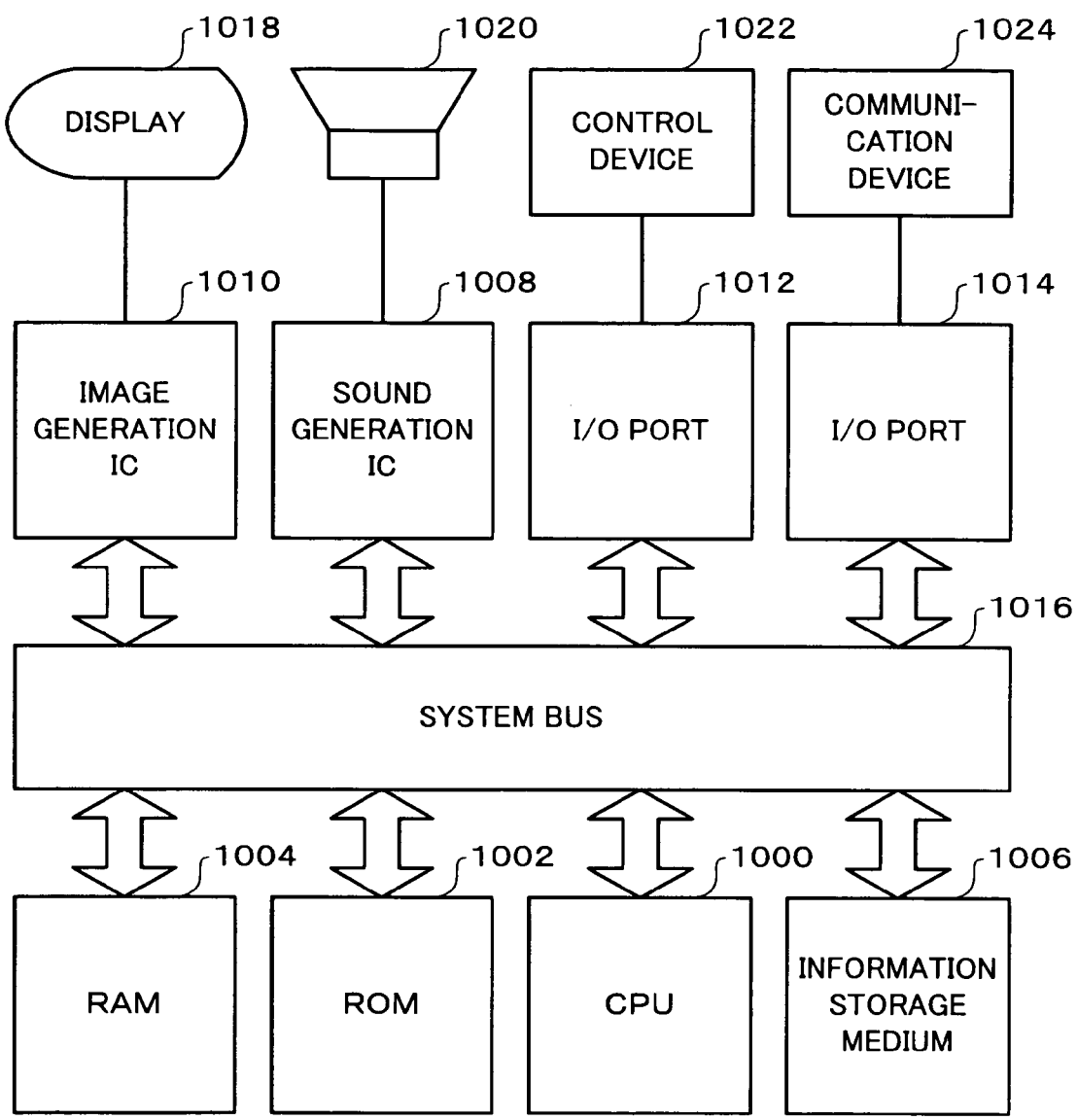
FIG. 14 illustrates a configuration of hardware for implementing the embodiment of the present invention.

FIGS. 11 to 13 are flowcharts illustrating various operations in one embodiment of the present invention. In this embodiment, the images representing the glass plate before and after broken are generated for each frame in the following manner.

In the present invention, a hit flag is used to represent the present state of an object such as a glass plate which can be divided and processed into part objects when it receives an impact. Such a hit flag is set at '0' before the hit; '1' immediately after the hit; '2' during the delay processing after the hit processing; and '3', when all the changes due to the hit are completed.

When a bullet hits the glass plate anywhere, the hit flag is set at '1' (steps S10 and S20). In this case, if that hit is the first hit, the hit flag will be changed from '0' to '1'. If the hit is done by the succeeding bullet after the first hit, the hit flag will be changed from '3' to '1'.

If the hit flag is '0', the glass plate is imaged as a single object (steps S30 and S40). This can relieve the load on the image processing since the glass plate is not still broken.

If the hit flag is any value other than '0', the glass plate is formed as an aggregate object consisting of a plurality of glass pieces or part objects (steps S30 and s50).

FIG. 12 is a flowchart illustrating the details of the image generating process for the aggregate object in the step S50 of FIG. 11.

At first, it is determined whether or not all the changes due to the hit have been completed or whether or not the hit flag is '3' (step S110). If the hit flag is '3', it is judged that any new part object to be changed is not present since the display form for each part object is not variable from the previous frame. Therefore, a group of processing steps S120–S170 for detecting any new object to be changed is omitted.

If the hit flag is not '3', it is then judged whether or not there is a frame immediately after the hit or whether or not the hit flag is '1' (step S120). If the hit flag is '1', the state flag of each of the part objects belonging to the first change area in which they will be broken immediately after the hit is set at '1' (step S130).

Thereafter, the hit flag of the aggregate object in question is set at '2' (step S140).

The state flag is provided for each of the part objects forming the aggregate object and has stored the value representing the state of each part object. If the state flag of one part object is '0', it represents that that part object is a glass piece having its normal state. If the state flag is '1', it represents one glass piece from the broken glass plate. If the state flag is '3', it represents that the glass plate has been broken into glass pieces.

When the hit flag is not '1', if it is required to perform such a delay processing as described in connection with FIGS. 9A–9D, the state flag of the part objects within an area in which the delay processing is performed is set at '1' (steps S150 and S160).

When it is required to perform the delay processing, the number of frames to be delayed may be previously determined. The delay processing may be performed after the condition is satisfied.

If the hit flag is not '3', the display form for the part objects will be changed (step S170).

Thereafter, the image of the aggregate object is generated after the display form for each of the part objects has been determined based on the state flag and coordinates of that part object (step S180).

FIG. 13 is a flowchart illustrating the details of the process of changing the display form for the part object at the step S170 in FIG. 12.

All the steps S210–S250 for all the part objects forming the aggregate object are performed.

If the state flag for each of the part objects is '1', this represents the break of the glass plate. Thus, the coordinates of its break pattern will be computed (step S220). The coordinates of the break pattern may be computed based on the coordinates and falling speed of the part object in question in the previous frame, for example.

It is then judged from the position coordinates so determined whether or not the break pattern reaches the floor (step S230). Since the change is terminated when the break pattern reaches the floor in this embodiment, the state flag of the part object is set at '2' if the determined coordinates indicate the reaching of the break pattern to the floor (step S240).

If all the steps S210–S240 are completed for all the part objects forming the aggregate object, it is judged whether or not any part object having its state flag of '1' exists in the part objects forming the aggregate object (step S260).

If there is no part object having its state flag of '1', this indicates that all the changes due to the hit are terminated. Thus, the hit flag of the aggregate object is set at '3' (step S280).

3. Hardware Arrangement

One hardware arrangement capable of implementing this embodiment will now be described with reference to FIG. 27. The system shown in FIG. 27 comprises CPU 1000, ROM 1002, RAM 1004, an information storage medium 1006, a sound generation IC 1008, an image generation IC 1010 and I/O ports 1012, 1014, all of which are interconnected through a system bus 1016 for data reception and transmission. The image generation IC 1010 is connected to a display 1018; the sound generation IC 1008 to a speaker 1020; the I/O port 1012 to a control device 1022; and the I/O port 1014 to a communication device 1024.

The information storage medium 1006 has mainly stored a program, image data for representing objects, sound data and others. For example, a home game apparatus may use DVD, game cassette, CD-ROM or the like as an information storage medium for storing the game program and other data. An arcade game apparatus may use a memory such as ROM or the like. In the latter case, the information storage medium 1006 is in the form of ROM 1002.

The control device 1022 corresponds to a game controller, control panel or the like. The control device 1022 is used by the player for inputting his or her judgment into the game system according to the progress of game.

CPU 1000 is to perform the control of the entire game system and the processing of various data according to the program stored in the information storage medium 1006, the system program (such as information for initializing the entire system) stored in the ROM 1002, input signals from the control device 1022 and so on. RAM 1004 is a memory means used as a working area for the CPU 1000 and has stored given contents in the information storage medium 1006 and ROM 1002 or the results of computation in the CPU 1000. The structures of data having a logical structure for implementing this embodiment may be build on this RAM or information storage medium.

The sound and image generation IC's 1008, 1010 in this game system are to output game sounds and images in a preferred manner. The sound generation IC 1008 is in the form of an integrated circuit for generating game sounds such as sound effects, background music and others, based on the information stored in the information storage medium 1006 and ROM 1002, the generated sounds being then outputted through the speaker 1020. The image generation IC 1010 is in the form of an integrated circuit which can generate pixel information to be outputted toward the display 1018 based on the image information from the RAM 1004, ROM 1002, information storage medium 1006 and so on. The display 1018 may be in the form of a so-called head mount display (HMD).

The communication device 1024 is to receive and transmit various pieces of information which are utilized in the game apparatus from and to external. The communication device 1024 is connected to the other game system (or systems) to transmit and receive given information corresponding to the game program from and to the other game systems or utilized to transmit and receive the information including the game program and other data through the communication line.

Various processing steps previously described in connection with FIGS. 1 to 26 are implemented by the information storage medium 1006 stored the information such as program, data and so on, and CPU 1000, image generation IC 1010 and sound generation IC 1008 which operate based on the information from the information storage medium 1006. The processings in the image generation IC 1010 and sound generation IC 1008 may be performed in a software manner through the CPU 1000 or all-purpose DSP.

When this embodiment is applied to such an arcade game system as shown in FIG. 1, a system board (or circuit board) 1106 included in the game system comprises CPU, image generating IC, sound generating IC and others all of which are mounted therein. The system board 1106 includes an information storage medium or semiconductor memory 1108 which has stored information for executing (or implementing) the processings of this embodiment (or means of the present invention). These pieces of information will be referred to "the stored information pieces".

Figure 15A:
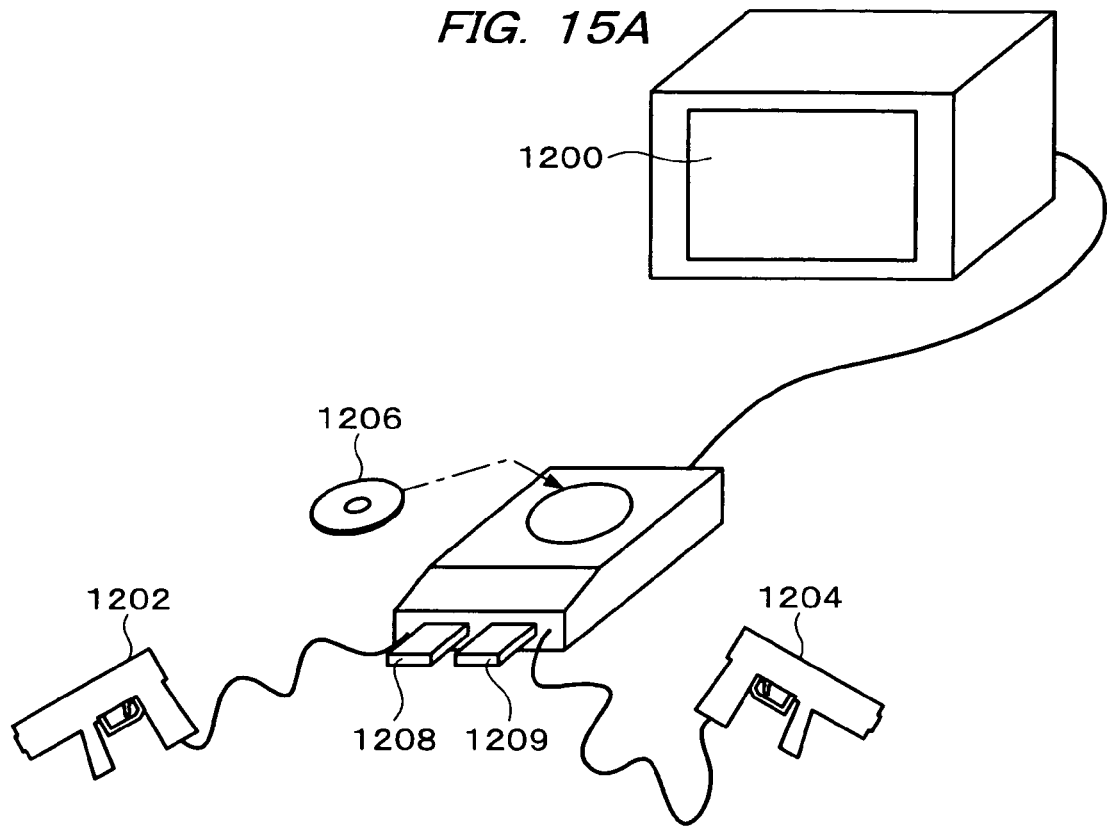
FIGS. 15A and 15B illustrate various forms of the game system according to the embodiment of the present invention.

FIG. 15A shows a home game apparatus to which this embodiment is applied. A player enjoys a game by manipulating game controllers 1202 and 1204 while viewing a game image displayed on a display 1200. In such a case, the aforementioned stored information pieces have been stored in DVD 1206 and memory cards 1208, 1209 which are detachable information storage media in the game system body.

Figure 15B:
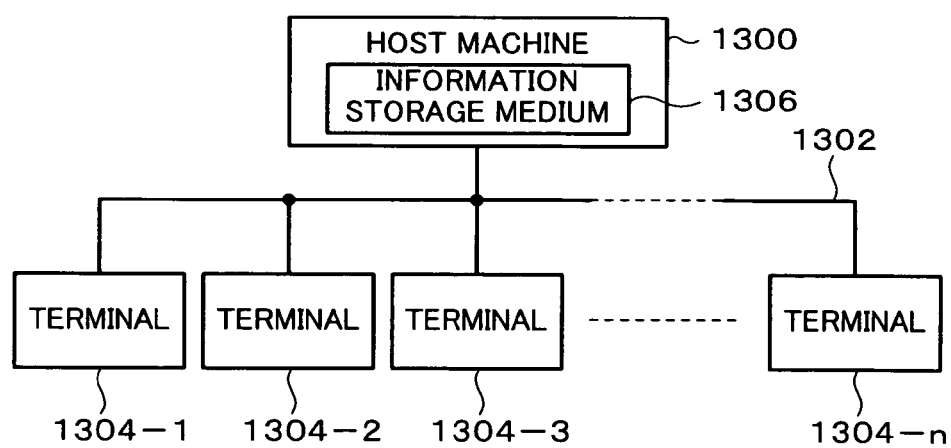

FIG. 15B shows an example wherein this embodiment is applied to a game system which includes a host machine 1300 and terminals 1304-1 to 1304-*n* connected to the host machine 1300 through a communication line (which is a small-scale network such as LAN or a global network such as INTERNET) 1302. In such a case, the above stored information pieces have been stored in an information storage medium 1306 such as magnetic disk device, magnetic tape device, semiconductor memory or the like which can be controlled by the host machine 1300, for example. If the terminals 1304-1 to 1304-*n* are designed each to have a CPU, image generating IC and sound processing IC and to generate game images and game sounds in a stand-alone manner, the host machine 1300 delivers game program and other data for generating game images and game sounds to the terminals 1304-1 to 1304-*n*. On the other hand, if the game images and sounds cannot be generated by the terminals in the stand-alone manner, the host machine 1300 will generate the game images and sounds which are in turn transmitted to the terminals 1304-1 to 1304-*n*.

In the arrangement of FIG. 15B, the processings of the present invention may be decentralized into the host machine (or server) and terminals. The above information pieces for implementing the present invention may be distributed and stored into the information storage media of the host machine (or server) and terminals.

Each of the terminals connected to the communication line may be either of home or arcade type. When the arcade game systems are connected to the communication line, it is desirable that each of the arcade game systems includes a portable information storage device (memory card or portable game machine) which can not only transmit the information between the arcade game systems but also transmit the information between the arcade game systems and the home game systems.

The present invention is not limited to the things described in connection with the above forms, but may be carried out in any of various other forms.

Although the present invention has been described as to the glass plate imaged as an aggregate object, it is not limited to it, but the present invention may similarly be applied to any other aggregate object imaged as a wall, water surface, smoke or the like. Furthermore, the present invention may be applied to an aggregate object consisting of a group of fishes, birds or other animals.

The change of state due to impact may be performed for the shape or color of each of the part objects or for the motion of a group of fishes, birds or other animals.

Other than the gun-type game, the present invention may similarly be applied to any of various other games such as other shooting games, fighting games, robot combat games, sports games, competitive games, role-playing games, music playing games, dancing games and so on.

Furthermore, the present invention can be applied to various image generating systems such as arcade game systems, home game systems, large-scaled multi-player attraction systems, simulators, multimedia terminals, image generating systems, game image generating system boards and so on.

The invention claimed is:

1. An image generating system which generates an image of an aggregate object formed by a plurality of part objects, the system comprising:
    object determination means that determines which part objects within a predetermined area in the aggregate object are objects to be changed in display form when an impact is applied to the aggregate object, thereby simulating breakage of the aggregate object, where at least one part object spatially separates and remains separated from the aggregate object and the impacted position is included within the predetermined area; and
    image generation means which changes at least one of shape, position, rotation angle, direction, moving direction and moving speed of the part objects determined as objects to be changed and generates an image.

2. The image generating system as defined in claim 1, wherein an area in which the display form of the part objects is changed is determined in accordance with at least one of the magnitude of the impact, the direction of the impact and the type of the aggregate object.

3. The image generating system as defined in claim 1, wherein an area in which the display form of the part objects is changed is randomly determined.

4. The image generating system as defined in claim 1, further comprising means which changes the display form of the part objects which are spaced further from the impacted position that change at a later time than the display form of the part objects closer to the impacted position.

5. The image generating system as defined in claim 1, further comprising means which changes the part objects which have already been changed to a first display form to further change to a second display form after a given time period has elapsed.

6. The image generating system as defined in claim 1,
wherein a plurality of image patterns used to generate images of the part objects after the change by the impact are previously provided; and
wherein the images of the part objects after the change by the impact are generated based on an image pattern selected from the plurality of image patterns.

7. The image generating system as defined in claim 1,
wherein the aggregate object is formed by assembling the part objects having different shapes without any gaps.

8. The image generating system as defined in claim 1,
wherein an image of the aggregate object is generated as an image of a single object before the impact is applied to the aggregate object, and the image is generated as an image of the aggregate object formed by the plurality of part objects after the impact.

9. A computer-readable program embodied on an information storage medium or in a carrier wave, storing information for operating an image generating system which generates an image of an aggregate object formed by a plurality of part objects, the program comprising information necessary for implementing:
object determination means that determines which part objects within a predetermined area in the aggregate object are objects to be changed in display form when an impact is applied to the aggregate object, thereby simulating breakage of the aggregate object, where at least one part object spatially separates and remains separated from the aggregate object and the impacted position is included within the predetermined area; and
image generation means which changes at least one of shape, position, rotation angle, direction, moving direction and moving speed of the part objects determined as objects to be changed and generates an image.

10. The computer-readable program embodied on an information storage medium or in a carrier wave as defined in claim 9, further comprising information necessary for determining an area in which the display form of the part objects is changed in accordance with at least one of the magnitude of the impact, the direction of the impact and the type of the aggregate object.

11. The computer-readable program embodied on an information storage medium or in a carrier wave as defined in claim 9, further comprising information necessary for randomly determining an area in which the display form of the part objects is changed.

12. The computer-readable program embodied on an information storage medium or in a carrier wave as defined in claim 9, further comprising information necessary for changing the display form of the part objects which are spaced more apart from the impacted position with more delay.

13. The computer-readable program embodied on an information storage medium or in a carrier wave as defined in claim 9, further comprising information necessary for changing the part objects which have already been changed to a first display form into a second display form after a given time period has elapsed.

14. The computer-readable program embodied on an information storage medium or in a carrier wave as defined in claim 9, further comprising information necessary for:
previously providing a plurality of image patterns used to generate images of the part objects after the change by the impact; and
generating the images of the part objects after the change by the impact based on an image pattern selected from the plurality of image patterns.

15. The computer-readable program embodied on an information storage medium or in a carrier wave as defined in claim 9, further comprising information necessary for forming the aggregate object by assembling the part objects having different shapes without any gaps.

16. The computer-readable program embodied on an information storage medium or in a carrier wave as defined in claim 9, further comprising information necessary for generating an image of the aggregate object as an image of a single object before the impact is applied to the aggregate object, and for generating the image as an image of the aggregate object formed by the plurality of the part objects after the impact.

* * * * *